United States Patent [19]

Rapp

[11] 4,366,251
[45] Dec. 28, 1982

[54] GLASS COMPOSITIONS AND THEIR FIBERS

[75] Inventor: Charles F. Rapp, Newark, Ohio

[73] Assignee: Owens-Corning Fiberglas Corporation, Toledo, Ohio

[21] Appl. No.: 273,816

[22] Filed: Jun. 15, 1981

[51] Int. Cl.³ .................. C03C 13/00; C03C 3/04
[52] U.S. Cl. ............................ 501/36; 501/70; 501/73
[58] Field of Search ............... 501/36, 70, 73; 162/145, 152

[56] References Cited

U.S. PATENT DOCUMENTS

| | | | |
|---|---|---|---|
| 2,020,403 | 11/1935 | Engle | 501/36 |
| 2,155,107 | 4/1939 | Tyler et al. | 501/36 |
| 2,576,312 | 11/1951 | Minnick | 501/36 |
| 3,184,372 | 5/1965 | Cotts | 501/36 |
| 4,249,991 | 2/1981 | Baes et al. | 162/145 |

FOREIGN PATENT DOCUMENTS

| | | | |
|---|---|---|---|
| 455781 | 4/1949 | Canada | 501/36 |
| 50-102618 | 8/1975 | Japan | 501/36 |

OTHER PUBLICATIONS

Thoenen, J. R., *Mineral Wool*, Information Circular, Bureau of Mines, U.S. Department of Interior, Jun. 1939, pp. 13, 16, 17, 25 & 29.

*Primary Examiner*—Mark Bell
*Attorney, Agent, or Firm*—Ronald C. Hudgens; Patrick P. Pacella

[57] ABSTRACT

Fiberizable glass compositions are disclosed. The fibers may be produced from sand, clay, limestone, dolomite or other suitable raw materials. The fibers can be used to make low density composites for ceiling tile or boards.

14 Claims, No Drawings

GLASS COMPOSITIONS AND THEIR FIBERS

TECHNICAL FIELD

This invention relates to fiberizable glass compositions. The fibers of this invention can be used to make low density composites for ceiling tile or boards.

BACKGROUND ART

Many silicate compositions can easily be melted and formed as a glass. However, only certain compositions have a viscosity which is suitable at reasonable temperatures for efficiently forming mineral wools. For example, a viscosity of approximately 10 poise (log n=1.0) at 2600° F. is recommended in the literature as an "optimum" high temperature viscosity for forming mineral wool fibers. However, many compositions which have viscosities in this range also have liquidus temperatures which are too high, being near or above the fiber forming temperature, which can lead to devitrification during fiber formation.

Desired uses of mineral wools are as high temperature insulation or as a constituent in fire resistant ceiling tile. These tiles are low density composites consisting primarily of mineral wool, clay, organic binders and organic fibers. During a fire, a number of complex reactions take place in the composite which include organic binder and fiber burn-out, low temperature bonding between inorganics and high temperature deformation and crystallization of the mineral wool. Therefore, mineral wools which are to be used in these high temperature applications should have a high softening temperature and should crystallize sufficiently rapidly so as to be "fire resistant." This crystallization will prevent the fibers from softening to the point where the ceiling tiles or boards will fall out of their suspension system during a fire. This must be considered in the formulation of the mineral wool since many compositional modifications which can be made to obtain the desired viscosity and liquidus will also affect the rate of crystallization and the softening point of the fibers.

DISCLOSURE OF INVENTION

I have developed mineral wool compositions for use in ceiling tile or boards. These compositions have a desirable viscosity and liquidus for glass forming and the desirable properties for product performance. I have found that these compositions yield the proper viscosity and liquidus for fiber forming, as well as a high softening temperature and rapid rate of crystallization which are desirable in the product performance of the resulting ceiling tile.

The mineral wools of this invention have the following composition:

| | Weight Percent |
|---|---|
| $SiO_2$ | 38–42 |
| $Al_2O_3$ | 6–10 |
| MgO | 12–16 |
| CaO | 35–40 |
| $Fe_2O_3$ | ≦2 |

Up to 2 weight percent of various other impurities or tramp materials also may be present in the compositions. These impurities can enter the glass as raw material impurities or can be products formed by the chemical reaction of the molten glass with the furnace components.

In one embodiment, the compositions of this invention have a CaO plus MgO content that ranges 46 to 52 weight percent.

In another embodiment, the compositions of this invention include that of akermanite which has been modified with $Al_2O_3$. That is:

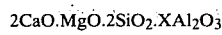

$$2CaO \cdot MgO \cdot 2SiO_2 \cdot XAl_2O_3$$

wherein X ranges from 0.20 to 0.38.

The mineral wool compositions of this invention have a viscosity of log n=1.0 at a temperature of 2600° F. (1427° C.) or less. Generally, the viscosity will be log n=1.0 at a temperature ranging from 2500° to 2600° F. (1371° to 1427° C.).

In order to determine how widely applicable these compositions are to ceiling tile and boards, the temperature for log n=12.0 was measured for the glasses. This is approximately the viscosity at which the fibers have become sufficiently soft so that significant sag will result in the ceiling tile.

Therefore, this temperature is an indication of how well the fibers will perform in a fire-rated ceiling tile.

I have also found in crystallization tests that if the $SiO_2$ is increased much above 43 weight percent the glass becomes quite stable with respect to devitrification and would decrease its "fire resistance." The same is true if the $Al_2O_3$ is increased about the limit shown.

If the $SiO_2$ is decreased significantly, the liquidus temperature will increase significantly. The CaO:MgO ratio can be varied somewhat with little effect on the glass properties. However, if the ratio is changed too greatly, the liquidus temperature will tend to increase. This is particularly true if the glass becomes too rich in MgO.

Specific glass compositions embodying the principles of this invention are described in Example I.

EXAMPLE I

TABLE I

| | Weight Percent | | |
|---|---|---|---|
| | 1 | 2 | 3 |
| $SiO_2$ | 39.7 | 40.9 | 42.0 |
| $Al_2O_3$ | 10.0 | 7.2 | 10.0 |
| MgO | 13.3 | 13.7 | 12.7 |
| CaO | 37.0 | 38.2 | 35.3 |
| Liquidus, temp., °F. | 2516 | 2541 | 2341 |
| Temp., °F., for log n = 1 | 2543 | 2560 | 2535 |
| Temp., °F., for log n = 12 | 1395 | 1396 | — |

The log n=1 viscosity determinations were obtained using the apparatus and procedure described in U.S. Pat. No. 3,056,283 and in the article in *The Journal of the American Ceramic Society*, Vol. 42, No. 11, November, 1959, pages 537–541. The article is entitled "Improved Apparatus for Rapid Measurement of Viscosity of Glass at High Temperatures" by Ralph L. Tiede. Other specific viscosity determinations in the region of log n=1 to log n=3 referred to herein also would be measured by the apparatus and procedures in the Tiede article. Log n=12.0 measurements were made on a beam-bonding viscometer as described by H. E. Hagy, "Experimental Evaluation of Beam-Bending Method of Determining Glass Viscosities in the Range of 108 to 1015 Poise," J. Am. Cer. Soc., 46 (2) 93–97 (1963).

Bulk nucleation and crystallization of mineral wool fibers is desirable when the fibers are to be used for high temperature applications. When fibers bulk nucleate and crystallize (as opposed to a random surface nucleation), they retain their fibrous nature after crystallization and thereby minimize shrink and also retain the desirable properties of fibers. It was found that bulk nucleation and crystallization could be produced in the glasses of this invention by including sulfur in the composition and by melting the glass under reducing conditions.

To determine the amount of sulfide necessary to produce bulk nucleation in these glasses, two series of melts were made of the composition 3 given in Example I. In the first series, the carbon addition was held constant at 1.0 weight percent while the sulfur addition (added as calcium sulfate) was varied from 0 to 2.0 weight percent $SO_3$. (The raw materials actually contained 0.03 weight percent $SO_3$ so that this was the lower limit rather than zero.) In the second series of glasses, the $SO_3$ addition was held constant at 1.0 weight percent, while the carbon addition was varied from 0 to 1.0 weight percent. These samples (about ½ inch cubes) were then heat-treated at the ASTM E-119 heating rate to 1650° F. The relative amount of crystallization was then measured on an x-ray diffractometer. The results are given in Table II.

TABLE II

| Melt # | Wt. % C Added | Wt. % $SO_3$ Added (as Sulfate) | Wt. % Sulfide (S=) | X-Ray Diffraction Peak Height for Akermanite at 31.3° 20 |
|---|---|---|---|---|
| 1 | 1.0 | 0 | 0.01 | 0 |
| 2 | 1.0 | 0.1 | 0.04 | 3 |
| 3 | 1.0 | 0.2 | 0.08 | 48 |
| 4 | 1.0 | 0.5 | 0.20 | 31 |
| 5 | 1.0 | 1.0 | 0.40 | 22; 49 |
| 6 | 1.0 | 2.0 | 0.80 | 49 |
| 7 | 0 | 1.0 | 0.40 | 0 |
| 8 | 0.1 | 1.0 | 0.40 | 0 |
| 9 | 0.2 | 1.0 | 0.40 | 0 |
| 10 | 0.5 | 1.0 | 0.40 | 1 |
| 11 | 1.0 | 1.0 | 0.40 | 22; 49 |

From the results it can be seen that a sulfide concentration of greater than 0.04 weight percent is needed for bulk nucleation of the glass. Also, the data demonstrates that sulfide sulfur nucleates the glass rather than sulfate since nearly 1.0 weight percent carbon is required to reduce 1.0 weight percent $SO_3$. (The theoretical amount of carbon needed for the $4C + CaSO_4 \rightarrow 4CO + CaS$ reduction of 1.0 weight percent $SO_3$ would be 0.60 weight percent carbon.)

Basically, production of the present fibers contemplates two steps. First, silica, dolomite, clay, limestone or other suitable raw materials are melted in a crucible, pot, or continuous glass melting unit, depending on the quantity of product wanted and the manner of fiber formation to be utilized. Second, when a suitably homogeneous melt is attained, amorphous fibers are produced from the melt in any conventional manner such as drawing, spinning, or blowing.

Regarding the equipment for the production of mineral wool according to the present invention, one may use any known melting oven for the production of traditional mineral wool. Preferably either a cupola oven or an electric furnace may be employed in combination with any known spinning device.

The melts can be produced in a cupola oven in which is loaded a mixture of the raw materials. Also added is the required quantity of coke for causing a burning and melting. If the melts are produced in an electric or gas fired furnace, it may be desirable to add some amount of reducing agent (such as powdered carbon) to chemically reduce the melt. The melt can be fibrated in a traditional spinning aggregate comprising four spinner wheels connected in a cascade.

INDUSTRIAL APPLICABILITY

This invention provides a mineral fiber tile which may be suspended from a system where individual tiles rest along their peripheral edges on an exposed or concealed suspension system.

A popular type of acoustical tile is made from the following general procedure. A mixtue of granulated mineral wool, fillers, certain coloring materials, if needed, and a binder, particularly one such as thick boiling starch, is prepared for forming the body of the tile. A low density mineral fiberboard product then is formed by flowing the slurry onto a conventional Fourdrinier type board making equipment.

The following example is illustrative being given in detail for a slurry dewatered in a deckle box having a drainage section, a suction section and a pressing section. It is to be understood that consistency, among other factors, may be varied when different apparatus is employed, for example, a cylinder felting machine or a static batch filter.

EXAMPLE II

In forming the low density sheet of this invention a conventional mixer, together with sufficient water to form a slurry of about 3.5% solids, was prepared. The ingredients and percent by weight solids are shown in the following table.

| Ingredients | Percent by Weight Solids |
|---|---|
| Perlite (JM, PA-116 | 14.7 |
| Starch (Durobond A) | 7.4 |
| Clay (M + D, M − 21) | 15.7 |
| Sizing (Silicone 1101, Dow Corning | 2.5 |
| Mineral Wool | 54.1 |
| Paper (Newsprint) | 5.4 |
| Alum | 0.3 |
| | 100.1% |

The ingredients were weighed out and mixed according to the following procedure. Water for the mineral wool was placed in a large mixer, wool was then added to the mixer and followed by a fiber dispersant (AR-QUAD). The mixture then was mixed until the ingredients were well dispersed. Generally, this will take about 10 minutes at a mixer speed of about 300 r.p.m. Clay and water were then mixed in a Waring blender for 12 minutes and added to the large mixer. Water and pulp were then mixed in the blender at high speeds. After the starch is added to the large mixer, add the pulp, followed by perlite sizing and alum. The entire mixture is then mixed for 20 minutes. A flocculant (Nalco 623jc) was added prior to pumping the slurry to a drain box. Water is then allowed to drain out of the box, which will usually take about 15 to 20 seconds. The drain box is then pulled with a vacuum of 28 inches pressure and the remaining water is drained off. The cake is next pressed to a thickness ranging from ¼" to ⅜". The pressure is held until water stops dripping out, which usually takes about 2 to 3 minutes. The sample is then placed in a steam cabinet for about 30 minutes and then in a drying oven overnight at 300° F.

When desired, a high density facing layer may be embossed, preferably prior to drying the board. This is particularly desirable when forming a product designed to have high esthetic characteristics.

I claim:

1. Mineral wool fibers having a composition consisting essentially by weight of:

|  | Weight Percent |
|---|---|
| $SiO_2$ | 38-42 |
| $Al_2O_3$ | 6-10 |
| MgO | 12-16 |
| CaO | 35-40 |
| $Fe_2O_3$ | $\leq 2$ |
| Other impurities | $\leq 2$ | wherein the composition consists of akermanite modified with $Al_2O_3$;
wherein the composition has a viscosity of log n = 1.0 at a temperature of 2600° F. or less, and
wherein the fibers have a high softening temperature as indicated by a viscosity of log n = 12.0.

2. Mineral wool fibers according to claim 1 wherein the composition is
$2CaO.MgO.2SiO_2XAl_2O_3$ wherein X ranges from 0.20 to 0.38.

3. Mineral wool fibers according to claim 1 wherein the composition is:

|  | Weight Percent |
|---|---|
| $SiO_2$ | 39.7 |
| $Al_2O_3$ | 10.0 |
| MgO | 13.3 |
| CaO | 37.0 | wherein the composition has a viscosity of log n = 1.0 at a temperature of 2543° F., and
wherein the fibers have a viscosity of log n = 12.0 at a temperature of 1395° F.

4. Mineral wool fibers according to claim 1 wherein the composition is:

|  | Weight Percent |
|---|---|
| $SiO_2$ | 40.9 |
| $Al_2O_3$ | 7.2 |
| MgO | 13.7 |
| CaO | 38.2 | wherein the composition has a viscosity of log n = 1.0 at a temperature of 2560° F., and
wherein the fibers have a viscosity of log n = 12.0 at a temperature of 1396° F.

5. Mineral wool fibers according to claim 1 wherein the composition is:

|  | Weight Percent |
|---|---|
| $SiO_2$ | 42.0 |
| $Al_2O_3$ | 10.0 |
| MgO | 12.7 |
| CaO | 35.5 | wherein the composition has a viscosity of log n = 1.0 at a temperature of 2535° F.

6. Mineral wool fibers according to claim 1 containing 0.04 to 1.5 weight percent sulfur which is substantially present in the sulfide state.

7. Mineral wool fibers according to claim 1 containing 0.07 to 1.0 weight percent sulfur which is substantially present in the sulfide state.

8. Ceiling tile or boards produced from mineral wool fibers having a composition consisting essentially by weight of:

|  | Weight Percent |
|---|---|
| $SiO_2$ | 38-42 |
| $Al_2O_3$ | 6-10 |
| MgO | 12-16 |
| CaO | 35-40 |
| $Fe_2O_3$ | $\leq 2$ |
| Other impurities | $\leq 2$ | wherein the composition consists of akermanite modified with $Al_2O_3$;
wherein the composition has a viscosity of log n = 1.0 at a temperature of 2600° F. or less, and
wherein the fibers have a high softening temperature as indicated by a viscosity of log n = 12.0.

9. Ceiling tile or boards according to claim 8 wherein the composition is:
$2CaO.MgO.2SiO_2XAl_2O_3$ wherein X ranges from 0.20 to 0.38.

10. Ceiling tile or boards according to claim 8 wherein the composition is:

|  | Weight Percent |
|---|---|
| $SiO_2$ | 39.7 |
| $Al_2O_3$ | 10.0 |
| MgO | 13.3 |
| CaO | 37.0 | wherein the composition has a viscosity of log n = 1.0 at a temperature of 2543° F., and
wherein the fibers have a viscosity of log n = 12.0 at a temperature of 1395° F.

11. Ceiling tiles or boards according to claim 8 wherein the composition is:

|  | Weight Percent |
|---|---|
| $SiO_2$ | 40.9 |
| $Al_2O_3$ | 7.2 |
| MgO | 13.7 |
| CaO | 38.2 | wherein the composition has a viscosity of log n = 1.0 at a temperature of 2560° F., and
wherein the fibers have a viscosity of log n = 12.0 at a temperature of 1396° F.

12. Ceiling tile or boards according to claim 8 wherein the composition is:

|  | Weight Percent |
|---|---|
| $SiO_2$ | 42.0 |
| $Al_2O_3$ | 10.0 |
| MgO | 12.7 |
| CaO | 35.5 | wherein the composition has a viscosity of log n = 1.0 at a temperature of 2535° F.

13. Ceiling tile or boards according to claim 8 wherein the composition includes 0.04 to 1.5 weight percent sulfur which is substantially present in the sulfide state.

14. Ceiling tile or boards according to claim 8 wherein the composition includes 0.07 to 1.0 weight percent sulfur which is substantially present in the sulfide state.

* * * * *